(12) United States Patent
Scheper et al.

(10) Patent No.: US 10,151,366 B2
(45) Date of Patent: Dec. 11, 2018

(54) COOLING SYSTEM FOR MULTI-DISC BRAKE ASSEMBLY

(71) Applicant: Kinetics Drive Solutions Inc., Langley (CA)

(72) Inventors: Ron Scheper, Aldergrove (CA); Jonathon Zimmerman, Burnaby (CA); Franco Caldarella, Lynden, WA (US); Simon Bachmann, White Rock (CA); Gerald Dyck, Abbotsford (CA)

(73) Assignee: KINETICS DRIVE SOLUTIONS INC., Langley (CA)

( * ) Notice: Subject to any disclaimer, the term of this patent is extended or adjusted under 35 U.S.C. 154(b) by 16 days.

(21) Appl. No.: 15/537,722

(22) PCT Filed: Dec. 22, 2015

(86) PCT No.: PCT/CA2015/051361
§ 371 (c)(1),
(2) Date: Jun. 19, 2017

(87) PCT Pub. No.: WO2016/101072
PCT Pub. Date: Jun. 30, 2016

(65) Prior Publication Data
US 2018/0274613 A1 Sep. 27, 2018

Related U.S. Application Data

(60) Provisional application No. 62/097,068, filed on Dec. 27, 2014.

(51) Int. Cl.
*F16D 65/853* (2006.01)
*F16D 55/36* (2006.01)
(Continued)

(52) U.S. Cl.
CPC .......... *F16D 65/853* (2013.01); *F16D 55/36* (2013.01); *F16D 69/00* (2013.01);
(Continued)

(58) Field of Classification Search
CPC ........ F16D 65/853; F16D 55/36; F16D 69/00; F16D 2065/783; F16D 2065/787; F16D 2065/788; F16D 2069/004
See application file for complete search history.

(56) References Cited

U.S. PATENT DOCUMENTS 4,014,410 A * 3/1977 Bryant .................... B60T 1/087
188/264 F
4,424,887 A 1/1984 Sommer
(Continued)

OTHER PUBLICATIONS

International Search Report, dated Mar. 8, 2016, for International Application No. PCT/CA2015/051361, 3 pages.
(Continued)

*Primary Examiner* — Russell Frejd
(74) *Attorney, Agent, or Firm* — Cozen O'Connor

(57) ABSTRACT

A multi-disc brake assembly comprising a disc pack may desirably be liquid cooled (i.e. is "wet") to dissipate the substantial heat generated from braking. In conventional assemblies, coolant fluid is generally delivered in a uniform manner to the discs in the disc pack. However, the heat distribution in the disc pack from braking is not uniform. But wear can be significantly increased where an inadequate amount of coolant is delivered, while drag can be increased unnecessarily where an excessive amount of coolant is delivered. In such an assembly, an improved coolant distribution can be obtained by appropriately varying the size of the numerous orifices which may be used to distribute coolant to the disc interfaces from an axial fluid rail provided in a rotating central shaft. Specifically, the orifices decrease in size from the middle to the ends of the disc pack.

23 Claims, 5 Drawing Sheets

(51) Int. Cl.
*F16D 69/00* (2006.01)
*F16D 65/78* (2006.01)
(52) U.S. Cl.
CPC .. *F16D 2065/783* (2013.01); *F16D 2065/787* (2013.01); *F16D 2065/788* (2013.01); *F16D 2069/004* (2013.01)

(56) References Cited

U.S. PATENT DOCUMENTS

| | | | |
|---|---|---|---|
| 4,540,073 A | 9/1985 | Rogier | |
| 4,562,902 A | 1/1986 | Scibbe | |
| 4,655,326 A * | 4/1987 | Osenbaugh | B60T 1/065 180/10 |
| 5,215,168 A | 6/1993 | Guiot et al. | |
| 5,390,986 A | 2/1995 | Hall, III | |
| 6,357,558 B1 * | 3/2002 | Case | F03C 1/0403 188/170 |
| 2007/0151814 A1 * | 7/2007 | Delayre | F16D 55/36 188/71.5 |
| 2008/0006501 A1 * | 1/2008 | Haupt | F16D 13/72 192/70.12 |
| 2012/0061191 A1 * | 3/2012 | Baumgartner | F16D 65/128 188/71.5 |

OTHER PUBLICATIONS

Written Opinion of the International Searching Authority, dated Mar. 8, 2016, for International Application No. PCT/CA2015/051361, 3 pages.

* cited by examiner

COOLING SYSTEM FOR MULTI-DISC BRAKE ASSEMBLY

TECHNICAL FIELD

The present invention pertains to multi-disc brake assemblies comprising a cooling system for the multiple discs. In particular, it pertains to improvements in the distribution of coolant in such assemblies.

BACKGROUND

Wet multi-disc brakes are used in various on and off highway vehicles. They are isolated from environmental dirt and are typically liquid cooled by oil. Often they are integrated directly into transmissions. Heavy tracked vehicles such as earth moving equipment or military armored vehicles typically have transmissions that have two output shafts, one for each track. Brakes are located at each of these outputs. The brakes may be used as service brakes to stop the vehicle or as steering devices to facilitate "skid steer" or both.

In order to slow or steer a tracked vehicle, a great deal of power must be dissipated. The power is usually converted to heat when the brake friction disks make contact with the reaction disks. The heat is removed by oil which is circulated to an oil-to-air cooler and the heat is then removed to the environment.

A brake designer is faced with many challenges including reducing weight and size as well as keeping parasitic losses to a minimum. The brakes must be small enough to fit into the vehicle, yet must have adequate cooling capacity to dissipate the heat generated from braking. Often, the available coolant flow is limited in order to keep auxiliary hydraulics small and to minimize flow losses. Although fully submerging the brake pack (e.g. in a sump) will provide the best cooling environment for the brake disk pack, drag losses created when the brakes are not energized will be unacceptably high. Most wet brake systems are therefore run above the oil level and are sprayed with oil either continuously or intermittently, and only during and for a short time after the braking event.

Various conventional brake systems, including the aforementioned, are disclosed in, for example, "Brake Technology Handbook" by Bert Breuer and Karlheinz H. Bill, published by SAE International, 2008, ISBN 978-0-7680-1787-8.

Notwithstanding the progress made to date using these more efficient cooled braking systems based on intermittent oil spray to the disc packs, there is a continuing need to improve brake performance with regards to energy and power dissipation while minimizing wear and without decreasing vehicle efficiency and/or without increasing the demand from the cooling system. The present invention addresses these and other needs as described below.

SUMMARY

The multi-disc brake assembly of the invention is liquid cooled and incorporates a cooling system which delivers coolant fluid (e.g. engine oil) to the interfaces between the numerous rotating discs and stationary discs in the assembly. The coolant fluid is distributed to these interfaces via a series of orifices that are fluidly connected to an axial fluid rail supplied with coolant fluid and located in a rotating central shaft in the assembly. It has been found that the temperature gradients in certain brake assemblies can be substantial and can greatly influence the wear rate of the friction materials therein if not adequately cooled. Although conventional brake assemblies can achieve adequate cooling by employing an excess of coolant, the consequences are surprisingly not insignificant. Unlike prior art brake assemblies, these orifices are not all the same size and instead vary in size such that coolant is delivered to the interfaces at different flow rates. Thus, appropriate varied amounts of coolant can be provided to each interface for the adequate removal of local heat without the use of a substantial excess of coolant. This results in overall improvement in performance of the brake assembly.

Specifically, the multi-disc brake assembly with cooling system comprises a housing, a coupling shaft, at least two rotating braking discs, a plurality of stationary braking discs, a plurality of friction materials, a plurality of gaps, a clamping mechanism, a supply of coolant fluid, and a mechanism for delivering the coolant fluid. The coupling shaft is capable of rotation with respect to the housing and comprises an axial torque transfer feature on the outside surface (e.g. a spline, keyway, drive lugs, etc.), a first axial fluid rail formed in the shaft and comprising an opening adjacent an end of the shaft, and a first plurality of orifices fluidly connecting the first axial fluid rail to the outside surface of the shaft. The two or more rotating braking discs have centre holes and are slidably mounted along the torque transfer feature on the shaft and are located such that the inner edges of each side of each rotating braking disc are in the vicinity of one of the orifices. The plurality of stationary braking discs have centre holes and are mounted to the housing and are interleaved among the rotating braking discs such that the stationary braking discs are incapable of rotation yet capable of axial motion with respect to the housing and such that a stationary braking disc is located on each side of a rotating braking disc. The plurality of friction materials are located in each interface between the rotating braking discs and the stationary braking discs and are mounted to either the rotating braking discs or to the stationary braking discs. The combination of the at least two rotating braking discs, the plurality of the stationary braking discs, and the plurality of friction materials create what is known as a disc pack. The plurality of gaps appear between the outside surface of the shaft and the plurality of friction materials and between the interleaved rotating braking discs and the stationary braking discs. Further, the gaps are located adjacent to at least one of the orifices. The clamping mechanism is for energizing the brake by clamping the rotating braking discs, the plurality of friction materials, and the stationary braking discs together. The supply of coolant fluid is connected to the axial rail opening in the shaft, and the coolant fluid delivery mechanism is for delivering the coolant fluid from the supply to the axial rail. In the present invention, the first plurality of orifices in the rail essentially decrease in size from the middle of the disc pack to the ends of the disc pack.

In one embodiment, the axial torque transfer feature in the assembly comprises a set of splines separated by cavities on the outside surface and the first plurality of orifices are located in one of the cavities on the shaft.

Typically, the at least two rotating braking discs are rotating friction discs and the plurality of stationary braking discs are stationary reaction discs. However, the reverse arrangement can also be considered in other embodiments. The plurality of friction materials may typically be attached to the rotating braking discs, but alternatively the friction materials may be attached to the stationary braking discs instead. The plurality of friction materials may comprise a plurality of grooves which desirably allows for the flow of coolant fluid across the friction materials.

In another embodiment, the shaft in the brake assembly can comprise an annular groove around the circumference of the shaft adjacent and fluidly connected to the axial rail opening. Alternatively, the annular groove may be formed in the housing but still fluidly connected to the axial rail opening. Such an arrangement can conveniently allow for the inclusion of additional fluid rails. For instance, the brake assembly can comprise a second axial fluid rail formed in the shaft and comprising an opening fluidly connected to the annular groove, along with a second plurality of orifices fluidly connecting the second axial fluid rail to the outside surface of the shaft. Further still, the brake assembly can comprise third and fourth axial fluid rails formed in the shaft and each comprising an opening fluidly connected to the annular groove. In a like manner, the third and fourth pluralities of orifices fluidly connect the third and fourth axial fluid rails respectively to the outside surface of the shaft. In this embodiment, the four axial fluid rails may desirably be spaced evenly around the outside surface of the shaft.

In exemplary practical embodiments of the invention, the brake assembly may for instance comprise 8 rotating friction discs, 9 stationary reaction discs, and 9 orifices fluidly connecting the axial fluid rail to the outside surface of the shaft. With regards to the orifice sizes, the ratio of the orifice size in the middle of the disc pack to the orifice size at an end of the disc pack can be in the range from about 1.2 to 1.4.

To accommodate wear or tolerances in manufacture, it can be advantageous to offset the first plurality of orifices in the first axial fluid rail from the second plurality of orifices in the second axial fluid rail. In embodiments in which the clamping mechanism is located at one end of the disk pack, those braking discs near the clamping mechanism end of the disc pack slide further along the shaft with overall wear than do the braking discs at the other end of the disc pack. Thus, the first plurality of orifices may desirably be offset from the second plurality of orifices by a decreasing amount from the clamping mechanism end of the disk pack to the other end of the disk pack.

Embodiments of the multi-disc brake assembly with cooling system can comprise a plurality of gaps between the outside surface of the shaft and the plurality of friction materials and between the interleaved rotating braking discs and the stationary braking discs. In such embodiments, a slot can be incorporated in one or more of the rotating braking discs such that the slot fluidly connects two neighboring gaps together. With such a design, coolant fluid may still be able to access a gap even though an orifice is clogged or covered by a braking disc as a result of wear. Desirably then, all the rotating braking discs may comprise slots fluidly connecting neighboring gaps together. And a suitable location for such slots is about ½ the distance between the outside surface of the shaft and the edges of the friction materials.

A method for operating a vehicle comprising the aforementioned multi-disc brake assembly with cooling system comprises: defining a set of braking events for the vehicle, detecting the onset of a braking event while the vehicle is operating, delivering coolant to the axial rail at a trickle flow rate in the absence of a braking event, delivering coolant to the axial rail at a braking flow rate when a braking event is detected, and continuing to deliver coolant to the axial rail at the braking flow rate for the duration of the braking event and for an additional set time thereafter.

Defined braking events for this purpose include one or more events selected from the group consisting of releasing the engine throttle, applying the service brake, and applying the parking brake.

The addition set time for the method can be determined by estimating the energy and power dissipated during the braking event, estimating the amount of coolant available for delivery to the axial rail, and calculating the additional set time based on the estimated energy dissipated, power dissipated, and the amount of coolant available.

In order to practice the method, the vehicle can comprise a microprocessor based control unit and the control unit is used to perform the steps of detecting the onset of the braking event, controlling the pumping of coolant, estimating the energy and power dissipated during the braking event and calculating the additional set time.

In exemplary practical embodiments, the trickle flow rate employed in the method can be about less than one quarter of the maximum flow rate. Further, the disc pack may be partially submerged in a sump of coolant that contacts the edges of the friction materials. And further still, the first plurality of orifices may be sized such that the ratio of the orifice sizes in the middle of the disc pack to the orifice size at an end of the disc pack is such that during a braking event when coolant is pumped to the axial rail at a braking flow rate, the flow through the orifices in the middle of the disc pack is approximately 2 times greater than the flow through the orifices at an end of the disc pack.

DETAILED DESCRIPTION

Unless the context requires otherwise, throughout this specification and claims, the words "comprise", "comprising" and the like are to be construed in an open, inclusive sense. The words "a", "an", and the like are to be considered as meaning at least one and are not limited to just one.

Herein, the term "coupling shaft" is used to denote a shaft or bar or a portion thereof which rotates and can transmit power and which may be coupled to another shaft.

The term "orifice" is ascribed its broadest plain meaning herein, referring to any kind of opening, aperture, hole, slot, or the like.

Further, the term "vicinity" is used to denote the location of the inner edge of rotating braking discs having centre holes with respect to nearby orifices in a coupling shaft. The inner edge of a rotating braking disc is that edge which defines the perimeter of the centre hole. The inner edge is considered to be in the vicinity of an orifice if coolant fluid can practically be or have been delivered thereto by way of the orifice. The term thus describes a functional relationship and not an absolute nor even a relative distance. For instance, the inner edge of an adjacent stationary braking disc may conceivably be closer to a given orifice than the relevant rotating braking disc which is in the vicinity of the orifice. Further, as a result of wear over the life of the multi-disc brake assembly, the inner edge of a rotating braking disc may not remain as accessible to coolant fluid from a given orifice as it once was when new. Nonetheless, if that orifice was once capable of delivering coolant fluid to the inner edge, it was thus in its vicinity.

In the claims and elsewhere, the term "essentially decrease" is used to describe how the size of a series of orifices varies within a common rail. It is intended to define a general decrease in size over a given distance. However, it should not be construed as necessarily requiring each and every orifice in the series to be smaller than its neighbouring orifice.

Figure 1:
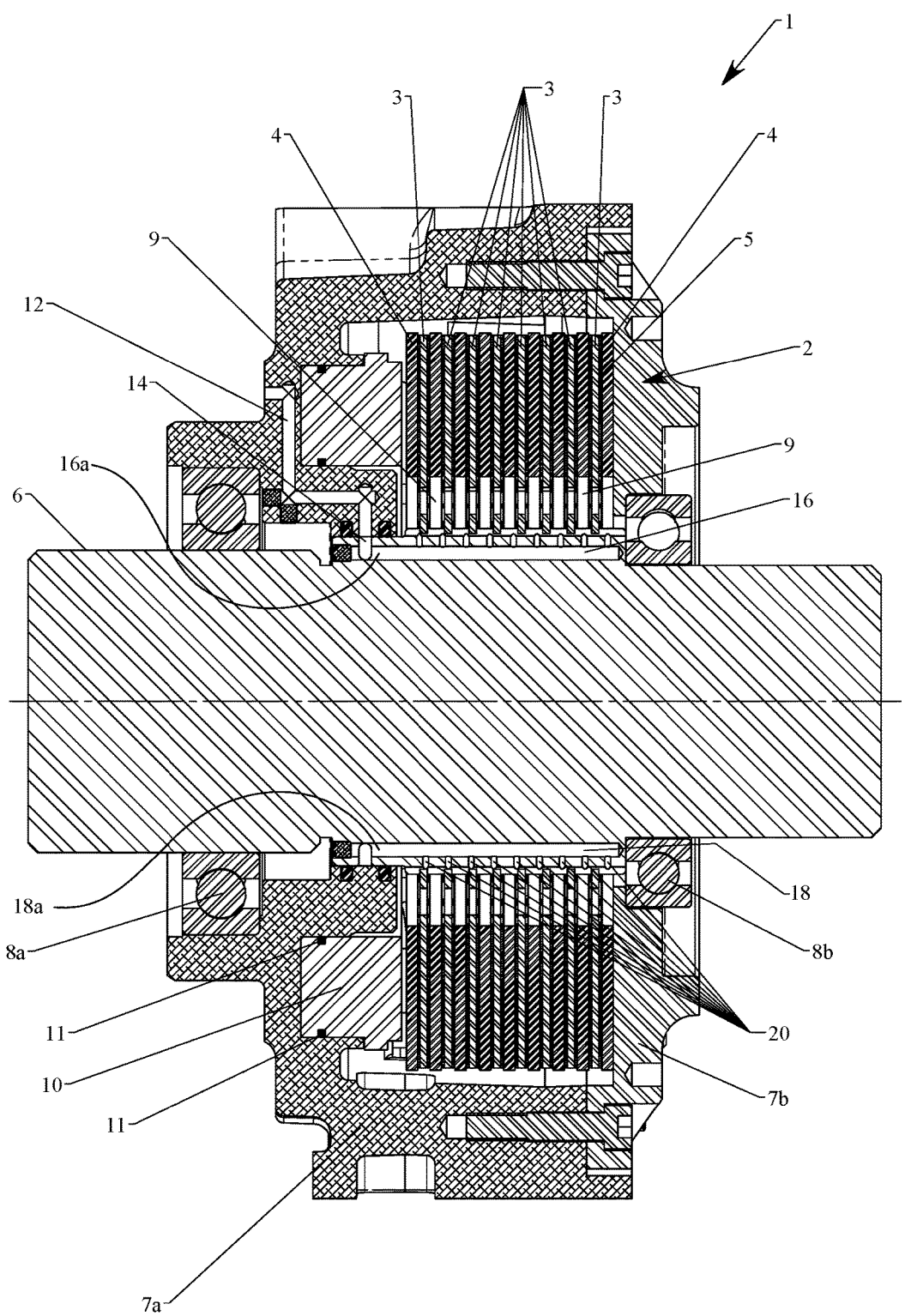
FIG. 1 shows a cross-sectional side view of a multi-disc braking assembly with cooling system of the prior art.

An exemplary prior art "wet" multi-disc braking assembly with a cooling system that uses engine oil as coolant fluid is shown in FIG. 1. There, a cross-sectional side view is presented of multi-disc braking assembly 1 which has a disc pack 2 comprising eight rotating braking discs 3 interspersed among nine stationary braking discs 4. Here, friction materials 5 are mounted on each side of each rotating braking disc 3 and these assemblies then serve as rotating double-sided friction discs (denoted as rotating friction discs 3,5 in the following) and stationary braking discs 4 also serve as stationary reaction discs. Both sets of braking discs have centre holes and are positioned around common central coupling shaft 6.

The components of multi-disc braking assembly 1 are housed in two part housing 7a, 7b. Coupling shaft 6 is mounted between bearings 8a, 8b which provide for smooth rotation within housing 7a, 7b. Coupling shaft 6 comprises a torque transfer feature on its outer surface to transfer torque from rotating coupling shaft 6 to rotating friction discs 3,5. However, the design of torque transfer feature is such that it also allows rotating friction discs 3,5 to slide in an axial direction along coupling shaft 6. For instance, coupling shaft 6 can comprise several axial splines (not visible in FIG. 1) on its outer surface that are separated by axial cavities (also not visible). Friction discs would therefore comprise a complementary set of slots (also not visible in FIG. 1) which engage the axial splines on the shaft and effect the transfer of torque. Rotating friction discs 3,5 thus engage with coupling shaft 6 and rotate therewith but are slidably mounted thereto and can move axially along coupling shaft 6.

In a like manner, suitable features are provided in housing 7a (not visible in FIG. 1) with complementary features provided on stationary reaction discs 4 (also not visible) so as to mount the latter to housing 7a and prevent rotation while still allowing for the latter to move axially with respect to coupling shaft 6 and hence housing 7a. Stationary reaction discs 4 are thus held stationary against rotation with respect to rotating friction discs 3,5 but both are capable of axial motion.

The centre holes of stationary reaction discs 4 in FIG. 1 are larger than those of rotating friction discs 3,5 in order to provide the necessary clearance around the torque transfer features on coupling shaft 6. The inner radius or edge of friction materials 5 is generally set then to match the inner radius or edge of stationary reaction discs 4. This results in a set of gaps 9 being created between the outside surface of coupler shaft 6 and the plurality of friction materials 5 and between interleaved rotating friction discs 3,5 and stationary reaction discs 4.

As mentioned, the design of the torque transfer features on coupling shaft 6 in combination with the complementary engagement features on rotating friction discs 3,5 allows for the latter to slide axially along shaft 6. And in a like manner, the features in housing 7a, 7b in combination with the complementary features on stationary reaction discs 4 allows for the latter to slide axially as well. The brake can thus be engaged by clamping disc pack 2 together in an axial direction and thereby engaging rotating friction discs 3,5 with stationary reaction discs 4 at the numerous interfaces between friction materials 5 and the latter. The brake is disengaged by unclamping disc pack 2 whereupon rotating friction discs 3,5 separate axially from stationary reaction discs 4. The various features providing for axial motion of both sets of braking discs also accommodate for wear and the corresponding reduction in thickness of friction materials 5.

In FIG. 1, annular piston 10 with piston seals 11 serves as a clamping mechanism for clamping disc pack 2 together. Piston 10 is driven hydraulically with pressurized hydraulic fluid provided at its base from a brake line (not shown). A mechanism (e.g. a spring arrangement of some type) for retracting piston 10 following a braking event is also provided but is not shown in FIG. 1.

"Wet" multi-disc braking assembly 1 has a cooling system that directs coolant fluid over the components in disc pack 2 to remove heat generated during braking events. In the embodiment of FIG. 1, oil used in the transmission serves as a possible supply of coolant fluid. Also in the embodiment of FIG. 1, the oil used in the transmission is engine oil so that a common fluid may be used in the drivetrain. Thus, brake coolant passage 12 in housing 7a fluidly connects a supply of oil coolant (not shown in FIG. 1) to annular groove 14 which is formed in the outer surface at an end of coupling shaft 6. In turn, annular groove is fluidly connected to two axial rails formed in and running along the length of shaft 6, namely first axial rail 16 and second axial rail 18. Each of axial rails 16, 18 comprise a plurality (nine) of similar orifices which allow fluid to access the outer surface of shaft 6. Coolant oil can thus be directed to disc pack 2 via orifices 20 in second axial rail 18 and also via the orifices in first axial rail 16 (note: the orifices in first axial rail 16 are visible but are not called out in FIG. 1 to avoid clutter). The orifices in first rail 16 and orifices 20 in second rail 18 are located in the vicinity of the inner edges of each side of rotating friction discs 3,5. Preferably, and as shown in FIG. 1, the orifices are located adjacent the respective gaps 9 appearing in disc pack 2. Coolant fluid directed to these locations can then readily access the interfaces between stationary reaction discs 4 and friction materials 5 on rotating braking discs 3, and thereby cool disc pack 2.

During a braking event then, oil coolant is delivered on demand from the supply of coolant oil to openings 16a and 18a in first and second axial rails 16 and 18 respectively. In FIG. 1, a pump (not shown) serves as a mechanism for delivering this coolant oil coolant on demand. Oil flows out of the orifices in first axial rail 16 and orifices 20 in second axial rail 18 into gaps 9. From there, oil moves radially outwards across the interfaces between stationary reaction discs 4 and friction materials 5 and removes heat therefrom. Finally, the now heated oil exits disc pack 2 at its outer edges and is collected and returned to the coolant oil supply.

An advantage of using such a shaft-oil supplied method of cooling over a sump-cooling method is that it provides a more even cooling across the braking discs. Uneven heat distribution, such as would be expected from having a portion of the hot braking discs submerged in oil, can lead to warping thereof. The shaft oil-supplied method minimizes drag losses associated with sump cooling as it can be controlled by an electro-hydraulic circuit as required during braking events. Sump cooling drag losses occur from having the friction discs rotate through a high level of stationary oil in the brake.

Figure 2:
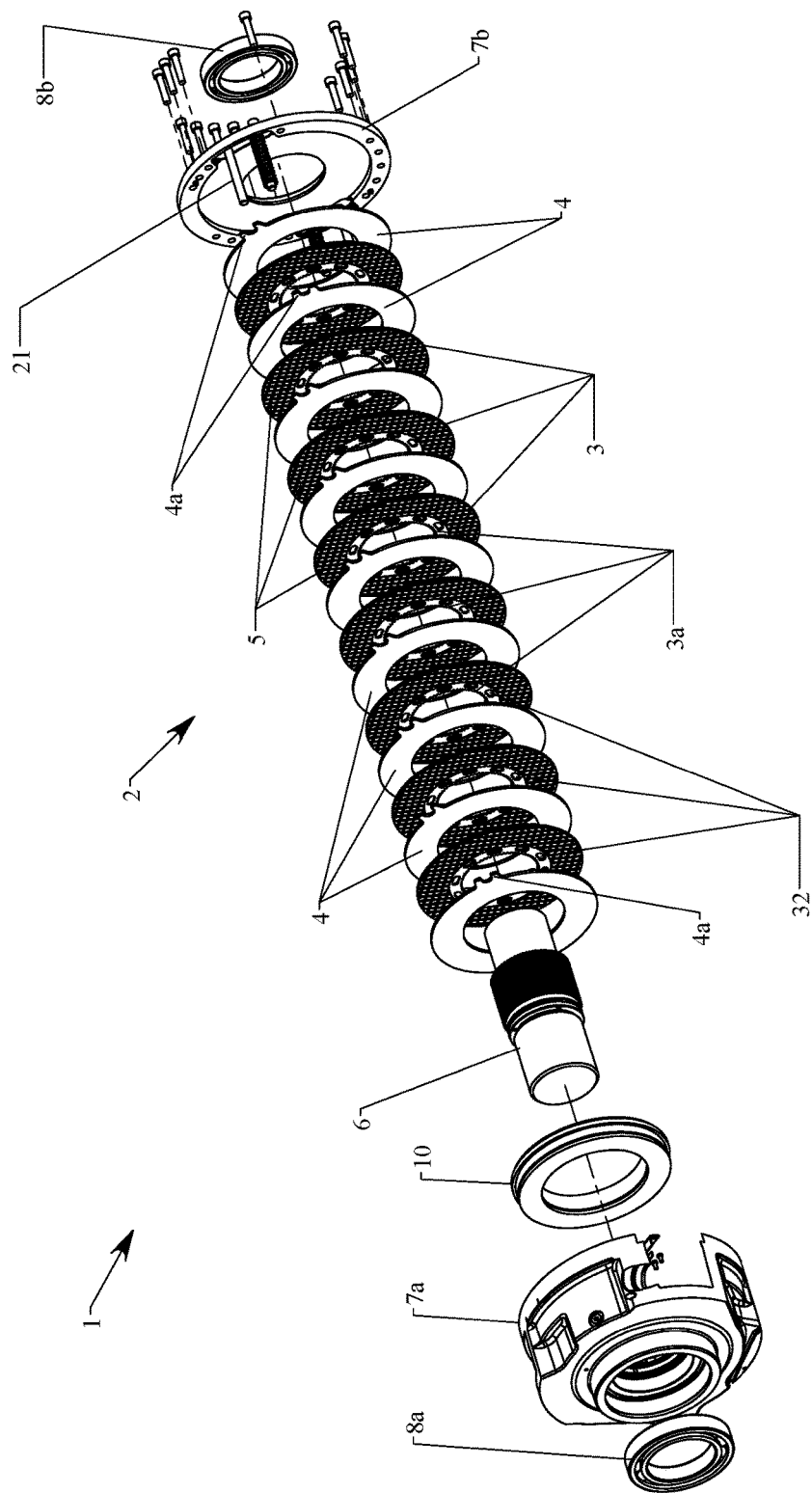
FIG. 2 shows an exploded view of the prior art multi-disc braking assembly with cooling system of FIG. 1.

FIG. 2 shows an exploded view of the prior art multi-disc braking assembly with cooling system of FIG. 1. (In FIG. 2, like numerals have been used to refer to elements common to those of FIG. 1.) Here, the complementary features, namely teeth 3a, on rotating braking discs 3 which slidingly engage with the torque transfer features, namely splines, on coupling shaft 6 are visible. Further, the complementary features, namely teeth 4a, on stationary reaction discs 4 which slidingly engage with pin 21 in housing 7b (which prevents rotation of stationary reaction discs 4) are also visible.

Note that in FIGS. 1 and 2, coupling shaft 6 is shown as a solid axle. In other embodiments, coupling shaft 6 may instead be hollow, with torque transfer features also provided on its inner surface. Such an alternative coupling shaft can act as a collar to engage a removable centre axle.

Figure 3:
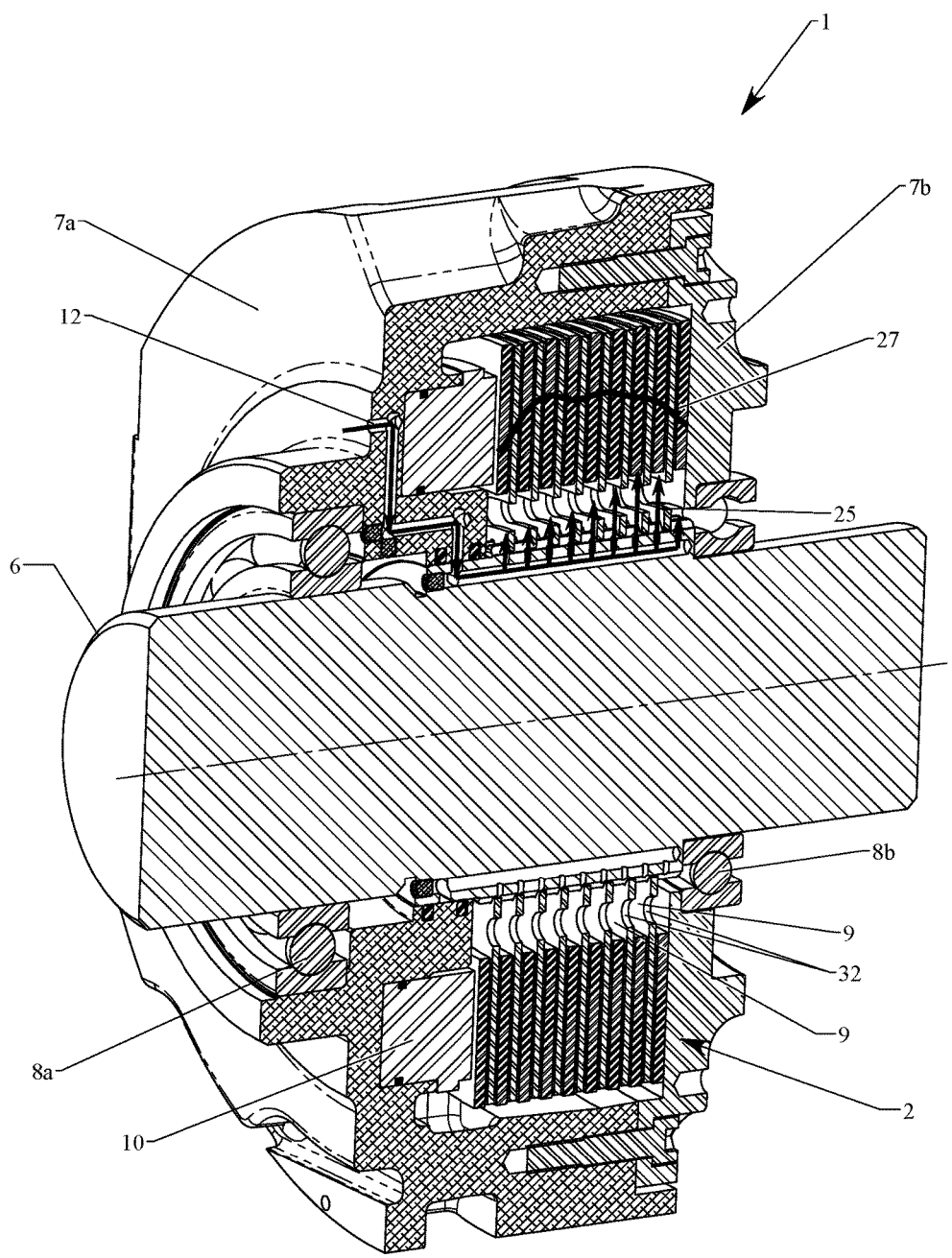
FIG. 3 shows a cross-sectional angled view of the multi-disc braking assembly with cooling system of FIG. 1. Schematic depictions of the coolant flow distribution and of the temperature distribution are also shown.

FIG. 3 shows a cross-sectional angled view of the multi-disc braking assembly with cooling system of FIG. 1. (Again here, like numerals have been used to refer to elements common to those of FIG. 1.) Here, the flow of coolant oil is shown (dark arrows) as it is supplied initially to coolant passage 12 and flows through first axial rail 16 and out through its respective orifices into gaps 9 in disc pack 2. The fluid orifices in the first axial rail 16 are generally of the same size and shape. The coolant flow through each orifice is shown by arrows 25 in FIG. 3. Although intuitively identical flows may be suggested by the same size of orifices this is not necessarily the case. The actual flow through each orifice is dependent on not only the diameter of the orifice but several other factors including coolant oil pressure, size and shape of the rail, and position of the orifice along the rail. In prior art designs, the individual flow is not optimized and an example of the resulting temperature gradient is shown by dark line 27 in FIG. 3 The temperatures near the ends of disc pack 2 are markedly lower than in the middle (central are) of disc pack 2.

In the present invention, the sizes of the orifices employed in the axial rails are not all the same and instead the orifice size is varied to adjust the relative flows of coolant fluid therethrough so as to smooth out the temperature profile across disc pack 2. In this way, the right amount of coolant to each friction interface can be delivered for cooling purposes (thereby reducing wear) without oversupplying coolant unnecessarily (thereby increasing drag and reducing efficiency). The desired adjustment in orifice size is not necessarily symmetrical about the true centre of the disc pack, nor necessarily monotonic (as is evident from temperature profile 27 in FIG. 3). Generally however, inventive embodiments are characterized by orifices that essentially decrease in size from the middle of the disc pack to the ends of the disc pack.

Figure 4:
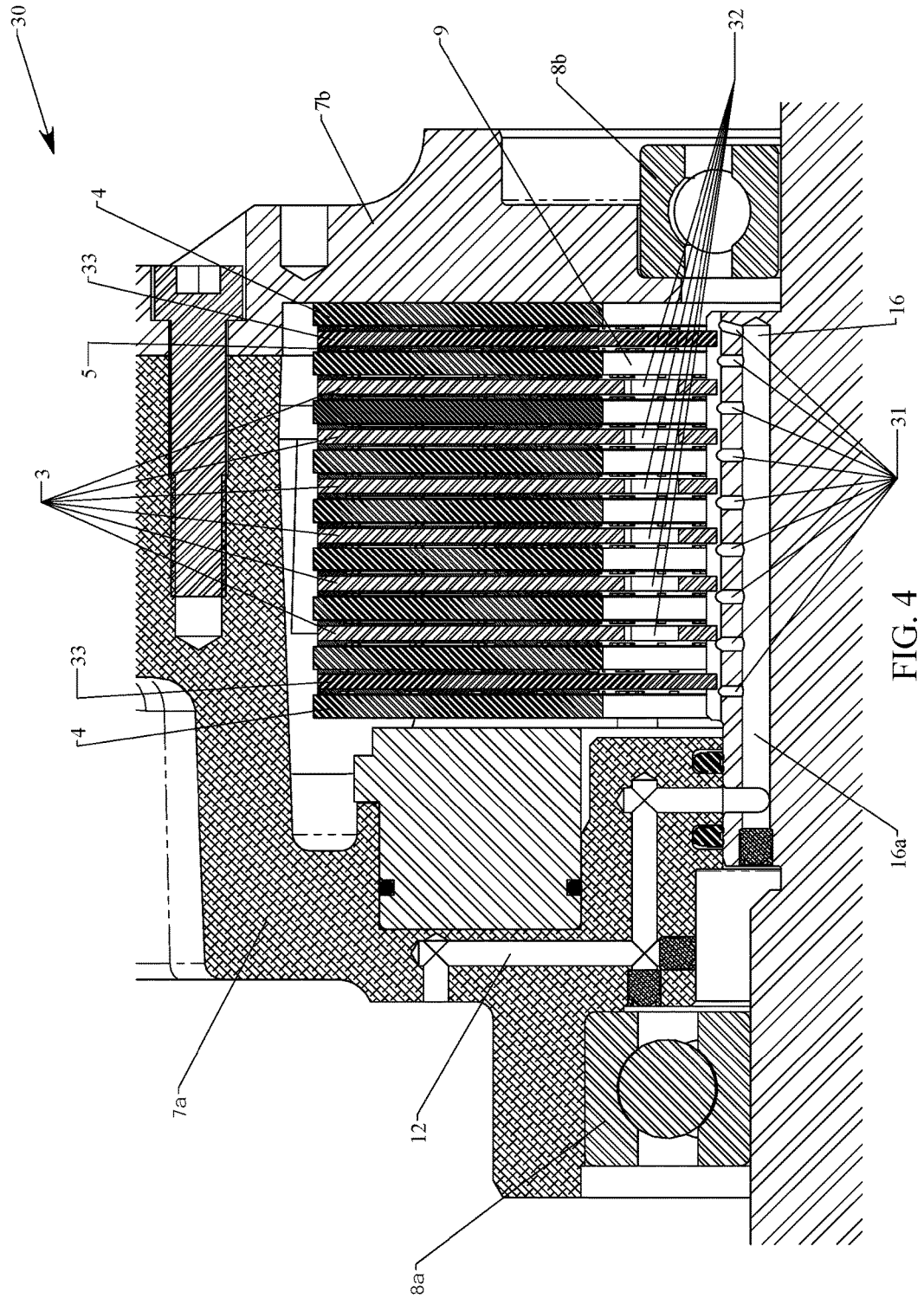
FIG. 4 shows a partial close-up cross-sectional side view of an exemplary multi-disc braking assembly with cooling system of the invention.

FIG. 4 shows a partial close-up cross-sectional side view of an exemplary multi-disc braking assembly with cooling system of the invention. The embodiment shown here is similar to that of the prior art embodiment shown in FIG. 1 with the exception of the size and location of the orifices in the axial rails and the absence of slots in the outer rotating braking discs. Thus again, like numerals have been used to refer to elements common to those of FIG. 1. And the view shown here is equivalent to an enlarged view of the upper portion of the embodiment of FIG. 1.

Inventive multi-disc braking assembly with cooling system 30 of FIG. 4 again has nine orifices 31 located in first axial rail 16. Although not easily seen, the orifices in the middle of first axial rail 16 are generally larger in size than those near the ends. Note that the right-most orifice 31 is formed at an angle to the vertical in this exemplary embodiment. An appropriate size and location for orifices 31 is generally specific to a given design of braking assembly but can readily be determined by those of skill in the art as discussed further below.

In multi-disc braking assembly 30, slots 32 are provided in those rotating braking discs 3 in the middle of disc pack 2. Slots 32 may be located about ½ the distance between the outside surface of coupling shaft 6 and the edges of friction materials 5. Slots 32 fluidly connect neighboring gaps 9 together and thus allow coolant fluid to access a given gap via a neighboring gap in the event that the orifice intended to supply the given gap becomes blocked or misaligned with the gap. This approach provides a small reservoir of coolant fluid and assists in balancing out the coolant distribution to any coolant-starved gap. The outermost rotating braking discs 33 do not require slots and hence are absent in those discs in FIG. 4.

Figure 5:
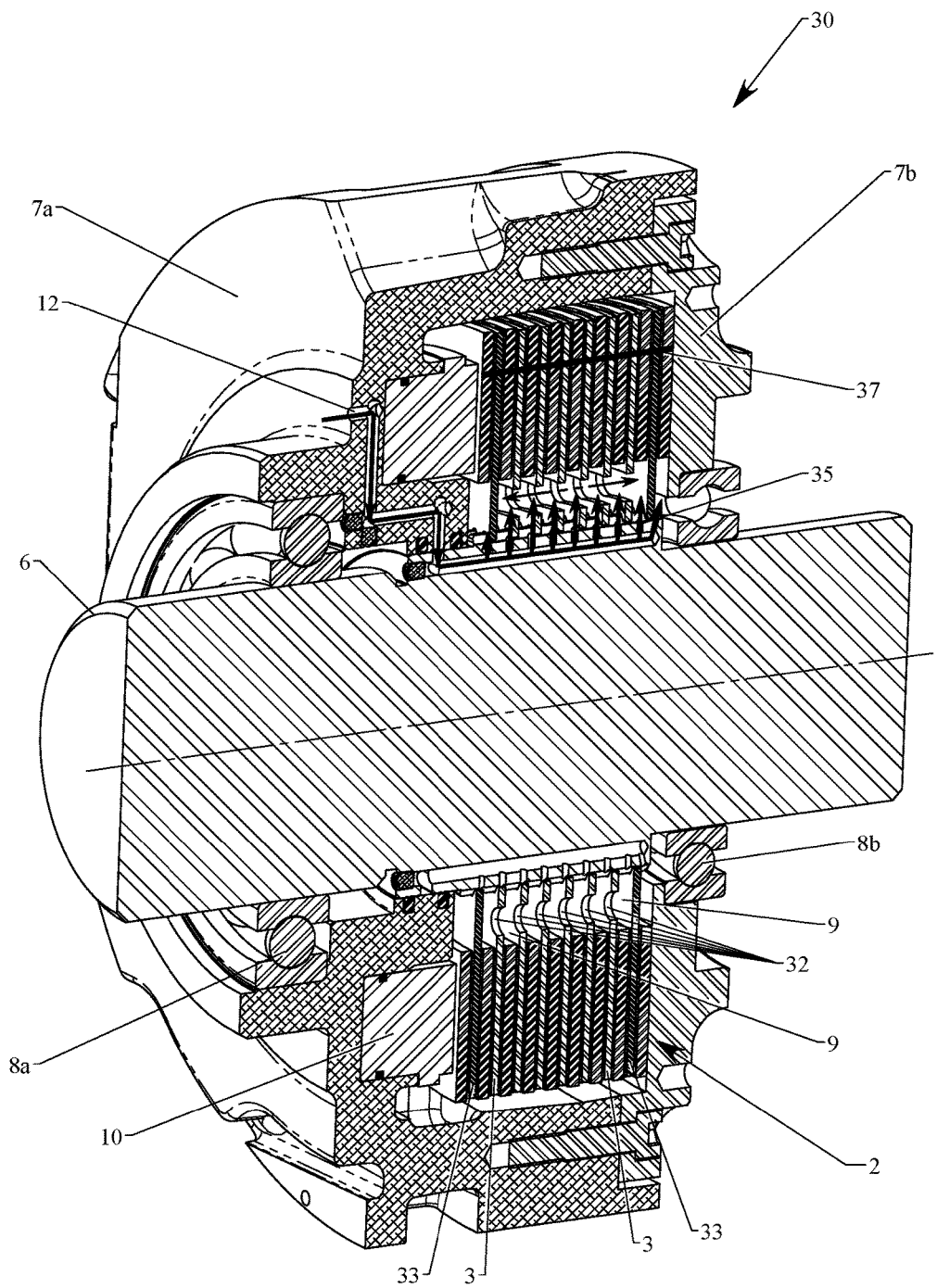
FIG. 5 shows a cross-sectional angled view of the inventive multi-disc braking assembly with cooling system of FIG. 4. Schematic depictions of the coolant flow distribution and of the improved temperature distribution are also shown.

FIG. 5 shows a cross-sectional angled view of the inventive multi-disc braking assembly with cooling system of FIG. 4. In a like manner to FIG. 3, the flow of coolant oil is again shown (dark arrows) as it is supplied initially to coolant passage 12 and flows through first axial rail 16 and out through its respective orifices (not called out in FIG. 5) into gaps 9 in disc pack 2. Now, the different coolant flows appear through each of the numerous orifices as suggested by the variable lengths of arrows 35 which represent coolant through an individual orifice. The lighter horizontal arrows shown in gaps 9 represent flow occurring through slots 32. In FIG. 5, dark line 37 qualitatively represents the improved uniform temperature profile across the disc pack.

Note that, although not visible in FIGS. 4 and 5, a plurality of grooves are provided in the surfaces of friction materials 5 in order to allow movement of the coolant fluid across the surfaces of the reaction discs from the inner edges to the outer edges of the friction materials when they are engaged with the reaction discs. Centrifugal forces arising from rotation of the friction discs assists with movement of the coolant fluid. Coolant fluid flow is thus structured to originate at the inner edges or radii of rotating braking discs 3 and, with the support of pressure and centrifugal forces, is passed through their outer edges or radii. The resulting forced convection heat transfer is the primary method of removing the heat developed at the friction material-reaction disc interfaces.

With regards to the control of coolant fluid during a braking event, brake coolant control can desirably be a proportional control rather than an on/off control. Operation can be programmed as a smart system (e.g. a microprocessor based control unit) to only provide high coolant flow when required during a braking event and for a duration thereafter to ensure that brake assembly components have cooled to a target temperature. For instance, a trickle flow of coolant may be supplied to ensure that all braking discs are properly lubricated in readiness for an upcoming braking event. Further, in anticipation of a braking event, a high flow of coolant can be triggered by the release of the engine throttle of the vehicle. This may desirably be done to ensure that the friction interfaces are fully lubricated prior to the actual braking event. The high cooling flow may also be triggered if either the parking brake or service brake is engaged. The high flow of coolant will be provided during a braking event and for a pre-determined period after the event. The duration of cooling after an event will be a function of the energy and power created during the brake event, and the amount of coolant available to use. The relationship between cooling time required and power and energy dissipated can be determined via experimental testing.

The following Examples have been provided to illustrate certain aspects of the invention but should not be construed as limiting in any way.

EXAMPLES

In the following, a prototype braking system intended for use in military vehicles is considered and evaluated. The braking system comprises of two wet, multi-disc brake assemblies with cooling systems. Similar to the embodiments shown in the preceding Figures, each multi-disc brake assembly contains eight rotating, double-sided friction discs and nine interspersed stationary reaction discs made of steel. Unlike the embodiments in the preceding Figures however, a centrally located, self-energizing, ball ramp was used to provide the clamping force to the disc pack.

A conventionally designed version of this braking system was installed in a vehicle so as to share a supply of oil with the vehicle's transmission. In the case of military vehicles it is desirable to use a single fluid for various drive train components and in this case the same grade engine oil was selected for use in the engine, transmission and brakes. In such vehicles, a limited oil volume and flow are available from the transmission to support the brake cooling, and thus high system efficiency is required in the brake assembly. In this conventional braking system, oil was sprayed into the middle of the disc pack and the discs did not touch the oil sump. The system was functionally similar to that depicted in FIGS. 1 to 3 above but did not use an axial fluid rail and orifices to deliver oil to the disc pack.

The energy dissipated during braking is proportional to the vehicle's mass and velocity and the majority of this energy is dissipated through the brakes in the form of heat. After undergoing field trials, it was found that this braking system was severely limited because of the ineffectiveness of the cooling and friction materials and thus did not allow for braking of the vehicle above 32 km/h. Further, the system also required short service intervals, and in addition, filter clogs within the transmission were caused from breakdown of the friction material.

To acceptably increase the possible braking power of the braking system, a greater flow of coolant could be considered. Estimates of the flow rate conventionally required to accomplish this ranged from 60 lpm to 200 lpm per brake assembly. However, coolant flows of this volume would require a large, dedicated pump to be integrated into the vehicle transmission. A pump of this capacity would decrease the overall efficiency of the transmission and increase the complexity of the hydraulic circuit.

Modifications in accordance with the invention were then evaluated to improve the temperature distribution across the disc pack and to improve the amount of heat transfer between the braking discs and the oil coolant while employing a minimal amount of oil flow.

A modified brake assembly similar to that shown in FIGS. 4 and 5 was designed, modelled and tested. The assembly was piston-actuated as shown with a spring return so that testing could be done in a controlled system. Braking events were simulated using a flywheel, equivalent to half the vehicle's inertia, driven at different speeds by a Variable Frequency Drive (VFD) dynamometer. The modified brake assembly would apply a braking torque to slow and eventually stop the rotational inertia. Instrumentation on the modified brake recorded temperatures, torque, piston position, coolant flow rates and brake pressures. Data from this testing was used to build cooling flow, thermal, and friction material models for the brake system. Using LMS AMESim software, these models were then used to predict the effects of different design parameters on the function of the braking system and thus to optimize coolant flow requirements and hence determine orifice sizes and locations.

Initially, the temperature profile expected within the disc pack of the conventionally design braking system was predicted. Here, the conventional braking system was essentially considered to be similar to that shown in FIGS. 1 to 3. In this embodiment, the orifice sizes in the axial rail are all the same in size and shape and with a representative coolant flow distribution 25 in FIG. 3. The predicted temperature profile however varied markedly over the axis of the disc pack as is qualitatively illustrated by temperature profile 27 in FIG. 3.

An exemplary improved design was then arrived at which comprised four axial rails equally spaced around the surface of the coupling shaft. Each axial rail employed nine orifices whose size from the middle to the ends of the rails and whose locations varied from rail to rail. The sizes and locations of the various orifices are summarized below.

In each rail, the orifices were circular in shape. Starting from the orifice closest to housing 7a and piston 10 in FIGS. 4 and 5 (i.e. the leftmost side), Table 1 shows the determined orifice number and size. To match the different flow rates desired from each orifice, the ratio of the orifice size in the middle of the pack to those at the ends was in the range from about 1.2 to 1.4 (e.g. when comparing the flow rate from orifice number 5 to orifices at either end).

TABLE 1

| Orifice Number and Respective Orifice Diameter | | | | | | | | |
|---|---|---|---|---|---|---|---|---|
| 1 | 2 | 3 | 4 | 5 | 6 | 7 | 8 | 9 |
| 1.9 mm | 2.5 mm | 2.5 mm | 2.4 mm | 2.4 mm | 2.3 mm | 2.2 mm | 2.1 mm | 1.8 mm |

Table 2 shows the spacings of the orifices along the four different axial rails. The absolute distances of each orifice from piston 10 are tabulated. In addition, the displacement that each orifice is offset axially from its equivalent number on the previous axial rail is also provided. The chosen spacings accommodate for wear of the friction materials in the disc pack. In this way, should wear result in orifice #1 in axial rail 1 becoming misaligned and/or blocked by a braking disc, coolant fluid can still be provided as desired through orifice #1 in another of the axial rails. As is evident from Table 2, the preferred amount of offset decreases with distance from the piston 10.

TABLE 2

| Orifice # | Rail #1 (mm) | Rail #2 (mm) | Rail #3 (mm) | Rail #4 (mm) |
|---|---|---|---|---|
| 1 (closest to piston) | 32.2 | 33 | 33.8 | 34.6 |
| displacement from previous rail | NA | 0.8 | 0.8 | 0.8 |

TABLE 2-continued

| Orifice # | Rail #1 (mm) | Rail #2 (mm) | Rail #3 (mm) | Rail #4 (mm) |
|---|---|---|---|---|
| 2 | 40.8 | 41.5 | 42.2 | 42.9 |
| displacement from previous rail | NA | 0.7 | 0.7 | 0.7 |
| 3 | 49.3 | 49.9 | 50.5 | 51.1 |
| displacement from previous rail | NA | 0.6 | 0.6 | 0.6 |
| 4 | 57.9 | 58.4 | 58.9 | 59.4 |
| displacement from previous rail | NA | 0.5 | 0.5 | 0.5 |
| 5 | 66.5 | 66.9 | 67.3 | 67.7 |
| displacement from previous rail | NA | 0.4 | 0.4 | 0.4 |
| 6 | 75 | 75.3 | 75.6 | 75.9 |
| displacement from previous rail | NA | 0.3 | 0.3 | 0.3 |
| 7 | 83.6 | 83.8 | 84 | 84.2 |
| displacement from previous rail | NA | 0.2 | 0.2 | 0.2 |
| 8 | 92.1 | 92.2 | 92.3 | 92.4 |
| displacement from previous rail | NA | 0.1 | 0.1 | 0.1 |
| 9 | 98.5 | 98.5 | 98.5 | 98.5 |
| displacement from previous rail | NA | 0 | 0 | 0 |

A maximum coolant flow rate per brake during braking events was chosen as a balance between brake performance, flow demand requirements on the hydraulic circuit, and drag losses. With this total flow rate during a braking event assumed and a preferred sump level chosen (see discussion below), the relative flow rates expected through the individual orifices are represented by the size of the arrows 35 in FIG. 5. The flow rates through the orifices in the middle of the disc pack here are roughly 2 times greater than that through the orifices at the ends of the disc pack.

These flows through the orifices were selected to achieve a balanced temperature profile across the disc pack during braking events. (Flow rates are roughly proportional to the temperature gradient that would otherwise exist across the conventionally designed disc pack.) The temperature distribution during braking across the disc pack of the exemplary improved brake assembly is qualitatively shown as temperature profile 37 in FIG. 5. The temperature distribution in the brake assembly of the invention was clearly improved when compared to that of the conventional brake assembly.

Through simulation, it had been determined that a combination of partially submerged cooling with forced lubrication could provide further gains in cooling efficiency. Sensitivity studies were performed concurrently with the above conventional system and modified tests to determine a preferred sump level of oil. The preferred sump level was found to be the lowest point at which the inner diameter of the friction material would contact the sump. This was the sump level chosen in the testing used to generate arrows 35 in FIG. 5.

Because friction lining wear rates are strongly correlated with temperature, balanced temperatures across the disc pack are desirable for even wear. To achieve this, coolant flow from each orifice in the axial rails is not uniform. The middle of the brake pack has the tendency to get hotter than the edges and thus in general, coolant flow is structured such that higher flows are provided through the orifices closer to the middle of the brake pack. Based on modelling here, the present invention allows for efficient use of cooling fluid flow to the brake system and limits the requirement to 40 lpm per brake. This flow can be achieved in practice solely through modest modification of the existing hydraulic circuit in the vehicle.

With the aforementioned improved, balanced temperature profile, modelling and testing show a substantial increase in braking capability for the improved braking system. The modified baking system is now capable of more than double the previous braking power and can provide for braking events from 71 to 0 km/h.

Further, the modified multi-disc brake assemblies have a substantially increased life expectancy due to the effective cooling that minimizes interface temperatures. Interface temperature is a major contributor to brake wear in wet brakes, with higher temperatures resulting in greater wear. The service interval of the improved brake assembly of the invention is as much as 6X greater than the original design, and this is based on an even more aggressive duty cycle.

All of the above U.S. patents, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

The invention claimed is:

1. A multi-disc brake assembly with cooling system comprising:
   a housing;
   a coupling shaft capable of rotation with respect to the housing and comprising an axial torque transfer feature on the outside surface; a first axial fluid rail formed in the shaft and comprising an opening adjacent an end of the shaft; and a first plurality of orifices fluidly connecting the first axial fluid rail to the outside surface of the shaft;
   at least two rotating braking discs with centre holes slidably mounted along the torque transfer feature on the shaft;
   a plurality of stationary braking discs with centre holes mounted to the housing and interleaved among the rotating braking discs such that the stationary braking discs are incapable of rotation yet capable of axial motion with respect to the housing and such that a stationary braking disc is located on each side of a rotating braking disc;
   a plurality of friction materials located in each interface between the rotating braking discs and the stationary braking discs and mounted to either the rotating braking discs or to the stationary braking discs;
   a plurality of gaps between the outside surface of the shaft and the plurality of friction materials and between the interleaved rotating braking discs and the stationary braking discs, wherein the gaps are located adjacent to at least one of the orifices;
   whereby a disc pack is created comprising the at least two rotating braking discs, the plurality of the stationary braking discs, and the plurality of friction materials;
   a clamping mechanism for clamping the rotating braking discs, the plurality of friction materials, and the stationary braking discs together;
   a supply of coolant fluid connected to the axial rail opening in the shaft; and
   a mechanism for delivering the coolant fluid from the supply to the axial rail;
   characterized in that the first plurality of orifices in the rail essentially decrease in size from the middle of the disc pack to the ends of the disc pack.

2. The multi-disc brake assembly with cooling system of claim 1 wherein the axial torque transfer feature comprises a set of splines separated by cavities on the outside surface and the first plurality of orifices are located in one of the cavities on the shaft.

3. The multi-disc brake assembly with cooling system of claim 2 wherein the at least two rotating braking discs are rotating friction discs and the plurality of stationary braking discs are stationary reaction discs.

4. The multi-disc brake assembly with cooling system of claim 1 wherein the plurality of friction materials are attached to the rotating braking discs.

5. The multi-disc brake assembly with cooling system of claim 1 wherein the plurality of friction materials comprise a plurality of grooves.

6. The multi-disc brake assembly with cooling system of claim 2 wherein the shaft comprises an annular groove around the circumference of the shaft adjacent and fluidly connected to the axial rail opening.

7. The multi-disc brake assembly with cooling system of claim 3 comprising 8 rotating friction discs, 9 stationary reaction discs, and 9 orifices fluidly connecting the axial fluid rail to the outside surface of the shaft.

8. The multi-disc brake assembly with cooling system of claim 1 wherein the ratio of the orifice size in the middle of the disc pack to the orifice size at an end of the disc pack is in the range from about 1.2 to 1.4.

9. The multi-disc brake assembly with cooling system of claim 6 comprising a second axial fluid rail formed in the shaft and comprising an opening fluidly connected to the annular groove; and a second plurality of orifices fluidly connecting the second axial fluid rail to the outside surface of the shaft.

10. The multi-disc brake assembly with cooling system of claim 9 wherein the first plurality of orifices in the first axial fluid rail are offset from the second plurality of orifices in the second axial fluid rail.

11. The multi-disc brake assembly with cooling system of claim 10 wherein the clamping mechanism is located at one end of the disk pack and the first plurality of orifices are offset from the second plurality of orifices by a decreasing amount from the clamping mechanism end of the disk pack to the other end of the disk pack.

12. The multi-disc brake assembly with cooling system of claim 9 comprising third and fourth axial fluid rails formed in the shaft and each comprising an opening fluidly connected to the annular groove; and third and fourth pluralities of orifices fluidly connecting the third and fourth axial fluid rails respectively to the outside surface of the shaft.

13. The multi-disc brake assembly with cooling system of claim 12 wherein the four axial fluid rails are spaced evenly around the outside surface of the shaft.

14. The multi-disc brake assembly with cooling system of claim 1 wherein at least one rotating braking disc comprises a slot fluidly connecting two neighboring gaps together.

15. The multi-disc brake assembly with cooling system of claim 14 wherein the slot is located about ½ the distance between the outside surface of the shaft and the edges of the friction materials.

16. The multi-disc brake assembly with cooling system of claim 14 wherein all the rotating braking discs comprise slots fluidly connecting neighboring gaps together.

17. A method for operating a vehicle comprising the multi-disc brake assembly with cooling system of claim 1, the method comprising:

defining a set of braking events for the vehicle;

detecting the onset of a braking event while the vehicle is operating;

delivering coolant to the axial rail at a trickle flow rate in the absence of a braking event;

delivering coolant to the axial rail at a braking flow rate when a braking event is detected; and continuing to deliver coolant to the axial rail at the braking flow rate for the duration of the braking event and for an additional set time thereafter.

18. The method of claim 17 wherein the defined braking events are selected from the group consisting of releasing the engine throttle, applying the service brake, and applying the parking brake.

19. The method of claim 17 comprising estimating the energy and power dissipated during the braking event; estimating the amount of coolant available for delivery to the axial rail; and calculating the additional set time based on the estimated energy dissipated, power dissipated, and the amount of coolant available.

20. The method of claim 17 wherein the vehicle comprises a microprocessor based control unit and the control unit performs the steps of detecting the onset of the braking event, controlling the pumping of coolant, estimating the energy and power dissipated during the braking event and calculating the additional set time.

21. The method of claim 17 comprising partially submerging the disc pack in a sump of coolant that contacts the edges of the friction materials.

22. The method of claim 17 wherein the coolant fluid is engine oil.

23. The method of claim 17 wherein the first plurality of orifices are sized such that the ratio of the orifice sizes in the middle of the disc pack to the orifice size at an end of the disc pack is such that during a braking event when coolant is pumped to the axial rail at a braking flow rate, the flow through the orifices in the middle of the disc pack is approximately 2 times greater than the flow through the orifices at an end of the disc pack.

* * * * *